US009976307B2

(12) United States Patent
Albers et al.

(10) Patent No.: US 9,976,307 B2
(45) Date of Patent: May 22, 2018

(54) FOUNDATION FOR WIND TURBINE

(71) Applicant: Wobben Properties GmbH, Aurich (DE)

(72) Inventors: Karsten Albers, Hinte (DE); Hendrik Egberts, Emden (DE); Ingo Meyer, Wiesmoor (DE); Sergio Sousa, Arcos de Valdevez (PT)

(73) Assignee: Wobben Properties GmbH, Aurich (DE)

( * ) Notice: Subject to any disclaimer, the term of this patent is extended or adjusted under 35 U.S.C. 154(b) by 666 days.

(21) Appl. No.: 14/412,938

(22) PCT Filed: Jun. 10, 2013

(86) PCT No.: PCT/EP2013/061869
§ 371 (c)(1),
(2) Date: Jan. 5, 2015

(87) PCT Pub. No.: WO2014/005795
PCT Pub. Date: Jan. 9, 2014

(65) Prior Publication Data
US 2015/0167304 A1 Jun. 18, 2015

(30) Foreign Application Priority Data

Jul. 6, 2012 (DE) .......................... 10 2012 211 888

(51) Int. Cl.
*B23P 11/00* (2006.01)
*E04C 5/16* (2006.01)
(Continued)

(52) U.S. Cl.
CPC .............. *E04C 5/162* (2013.01); *B21F 27/12* (2013.01); *E02D 27/42* (2013.01); *E04C 5/0618* (2013.01); *F03D 13/22* (2016.05)

(58) Field of Classification Search
CPC ... B23Q 1/01; B23Q 1/25; B23Q 3/00; B23Q 3/06; B25B 11/00
See application file for complete search history.

(56) References Cited

U.S. PATENT DOCUMENTS

| 4,018,251 A | 4/1977 | Mündel et al. |
| 5,141,211 A * | 8/1992 | Adams, Jr. ............... B25H 3/06 269/16 |

(Continued)

FOREIGN PATENT DOCUMENTS

| DE | 468 401 C | 11/1928 |
| DE | 2 426 027 A1 | 12/1974 |

(Continued)

*Primary Examiner* — Lee D Wilson
(74) *Attorney, Agent, or Firm* — Seed Intellectual Property Law Group LLP

(57) ABSTRACT

The invention relates to a device, in particular having: a support structure, which can be driven in a rotary manner about an axis X, a plurality of rods, which are aligned parallel or conically approaching each other, relative to the axis X, and are preferably uniformly distributed around the support structure along a circumference, wherein each of the rods is connected to the support structure by means of two or more spokes, and have a plurality of recesses on the outer side thereof facing away from the support structure which are configured to receive reinforcement material, a number of pokes corresponding to the number of rods can be arranged in a plane perpendicular to the axis X, and the lengths of the spokes are adjustable by motor in a telescoping manner.

15 Claims, 7 Drawing Sheets

(51) Int. Cl.
*E02D 27/42* (2006.01)
*B21F 27/12* (2006.01)
*E04C 5/06* (2006.01)
*F03D 13/20* (2016.01)

(56) References Cited

U.S. PATENT DOCUMENTS

| | | | |
|---|---|---|---|
| 6,109,600 A * | 8/2000 | Yost | B25H 1/0007 |
| | | | 269/131 |
| 6,944,951 B2 | 9/2005 | Barden | |
| 7,448,606 B1 * | 11/2008 | Johnson | B05B 13/0285 |
| | | | 269/16 |
| 8,322,107 B2 | 12/2012 | Murata | |
| 8,844,237 B2 | 9/2014 | Kapitza et al. | |
| 2004/0049910 A1 | 3/2004 | Barden | |
| 2010/0129162 A1 | 5/2010 | Kristensen | |
| 2010/0150663 A1 | 6/2010 | Martinez | |
| 2013/0129474 A1 | 5/2013 | Schacknies et al. | |
| 2015/0167304 A1 * | 6/2015 | Albers | E02D 27/42 |
| | | | 52/749.1 |

FOREIGN PATENT DOCUMENTS

| | | |
|---|---|---|
| DE | 24 32 855 A1 | 1/1976 |
| DE | 3634736 A1 | 4/1988 |
| DE | 601 24 756 T2 | 10/2007 |
| DE | 10 2010 028 038 A1 | 10/2011 |
| GB | 1 449 144 A | 9/1976 |
| JP | 5-179894 A | 7/1993 |
| JP | 7-91046 A | 4/1995 |
| RU | 2093649 C1 | 10/1997 |
| TW | 201144590 A1 | 12/2011 |
| WO | 2011064886 A1 | 3/2011 |
| WO | 2012/055803 A2 | 5/2012 |

* cited by examiner

FOUNDATION FOR WIND TURBINE

BACKGROUND

Technical Field

The present invention concerns an apparatus for producing reinforcement cages for pylon segments. It concerns in particular an apparatus for producing reinforcement cages for pylon segments of wind power installations.

Description of the Related Art

Pylons as are used inter alia for wind power installations often have a wall of concrete or steel reinforced concrete. Particularly in the case of dynamically loaded pylons, which involves most pylons due to the influences of the wind, stiffening structures, so-called reinforcement cages, are additionally provided in the interior of the pylon wall to improve stability. In that case the construction of a pylon is made up segment-wise, that is to say a pylon is includes a plurality of substantially annular pylon segments which are to be placed one upon the other.

In the production of such pylon segments firstly the reinforcement cage is produced and then concrete is introduced around it in molds provided for that purpose, and the concrete is set.

In known apparatuses for producing reinforcement cages for pylon segments, there is provided a carrier structure which holds a plurality of bars, so-called combs or rakes. Those bars each have receiving means for receiving steel wires, the steel wires being passed around the carrier structure to form ring elements. Those ring elements, stabilized by the bars, are tied to steel elements which extend in orthogonal relationship therewith and which are pre-shaped in an arcuate configuration, thereby producing a grid-form reinforcement cage. The reinforcement wires are either passed in a circular movement around a stationary carrier structure or, and this is preferred, they are disposed in a stationary feed device and are pulled out of the receiving means by the carrier structure which is drivable in rotation, and are applied, as a result of the rotational movement of the carrier structure, in a ring form around same. Throughout the entire time the form of the ring-form steel wires is stabilized by the carrier structure and the bars by means of a plurality of spokes extending between the carrier structure and the bars. To remove the reinforcement cages from the apparatus the spokes in the known system have to be respectively removed or the stabilizing bars have to be hooked individually and manually out of the steel wires.

While the apparatuses operating in that way generally provide reinforcement cages of satisfactory quality, the fact that in that case a high degree of manual work is required, in particular for releasing the reinforcement cages from the apparatuses, is viewed as a disadvantage.

BRIEF SUMMARY

One or more embodiments of the invention are directed to an apparatus for producing reinforcement cages for pylon segments, which permits the production of reinforcement cages of the same or higher quality in a shorter time.

One embodiment of the invention is directed to an apparatus for producing reinforcement cages for pylon segments, in particular for pylon segments of wind power installations, comprising a carrier structure which is drivable in rotation about an axis X, a plurality of bars which are oriented in parallel relationship relative to the axis X and are distributed along a periphery preferably uniformly around the carrier structure, wherein each of the bars is connected to the carrier structure by means of two or more spokes and at its outer side remote from the carrier structure has a plurality of recesses adapted to receive reinforcement material, a respective plurality of spokes are arranged in accordance with the number of bars in a plane perpendicular to the axis X, and the spokes are adjustable telescopically in their length by a motor or motor means. In that respect the motorized drive of all spokes makes it possible for them to be retracted without manual intervention after production of the reinforcement cage has been effected. That is, the motorized drive makes it possible to reduce the diameter defined by the spokes in such a way that the reinforcement cage can be removed upwardly out of the apparatus. That solution at the same time affords a further significant advantage: the diameter defined by the spokes can not only be reduced for the purposes of removal of the reinforcement cage, but rather the motorized adjustment of the spoke length can be used to predetermine different diameters for the reinforcement cage to be produced, at a time which is already prior to reinforcement cage production. In other words, with one and the same apparatus it is already possible solely by virtue of the motor drive to produce reinforcement cages for pylon segments of different pylon sizes and segments for different pylon heights; pylons of wind power installations converge in a generally tapering configuration from the foundation in the direction of the pod. In that case the pylon segments either are seated in a stepped arrangement on each other or and this is preferred they are of a conical configuration. Each further pylon segment placed on the top of existing pylon segments thus requires a reinforcement cage of progressively decreasing cage diameter. Instead of converting the apparatus to deal with the respective diameter or instead of holding in readiness apparatuses for each individual pylon segment diameter or reinforcement cage diameter for each pylon segment, one or more embodiments of the invention make it possible to predetermine a plurality of different diameters for reinforcement cages, with one and the same apparatus. In the case of a wind power installation pylon comprising eight pylon segments, a total of eight different working stations would have been necessary for producing eight different reinforcement cages, when using apparatuses known in the state of the art. One or more embodiments make it possible to reduce the number of apparatuses for producing the reinforcement cages in this example to two. Besides the increased time efficiency in the production of the reinforcement cages, that also provides an enormous saving potential in terms of production engineering.

One embodiment provides that the length of all respective spokes is synchronously adjustable in a plane. That achieves two advantages. On the one hand the synchronous adjustment of all respective spokes in a plane ensures that the spokes in that plane ensure a circular periphery, with their outer ends. On the other hand, this means that not all spokes on the carrier structure are fixed at one and the same length, but rather the spokes in a respective plane are of the same length while the spokes in an adjacent plane can be of a different length which in turn is respectively adjustable synchronously for all spokes in the corresponding plane. That also makes it possible to produce conical reinforcement cages, which is particularly preferred in regard to the pylons of wind power installations.

Preferably the length of the spokes is steplessly adjustable. In that respect an adjustment of the length of the spokes in steps of a few millimeters, for example three to four millimeters per step, is also deemed to be stepless, which in consideration of the large diameters of the reinforcement cages for pylon segments, is also self-evident.

In a preferred embodiment of the invention the apparatus has a single central drive unit or a central drive unit for each plane of spokes, which is adapted for motor adjustment of the respective spokes and to which there is coupled for each spoke a transmission synchronously drivable by the drive unit. In accordance with the first alternative of this preferred embodiment there is provided a single drive unit for ensuring synchronous drive of all spokes of the apparatus by means of suitable force transmission members. Each drive movement of the central drive unit leads to a change in length of the spokes by the same lengthwise amount. That mechanically imposed synchronization can be used to produce both cylindrical reinforcement cages and also conically tapered reinforcement cages, insofar as the spokes in their respective plane are set to a basic length which is relevant for the respective plane. The different basic lengths define the angle of the taper because they define a differing diameter for each plane. If the spokes in all planes are altered by the central drive unit, by the same deflection amount, that gives a change in the diameter as all planes have changed uniformly, but it does not give a change in the taper angle.

In accordance with the second alternative of this preferred embodiment each plane of spokes is motor-drivable separately by its own drive unit. In that way the spokes in the respective planes can be adjusted synchronously with each other but independently in comparison with the other planes. That makes it possible to produce reinforcement cages with different taper angles.

A further development of the preferred embodiment provides that the drive unit has a shaft with one or more gears and the transmissions of the spokes are respectively coupled to the shaft by means of roller chains. In a preferred alternative the drive unit is a hydraulic drive and each spoke has a hydraulically actuated piston which can be acted upon with pressure by the hydraulic drive for length adjustment.

In a further preferred development of the invention the apparatus has a decentral drive system for motorized length adjustment, more specifically in such a way that each spoke has its own drive unit. Preferably the respective drive for all spokes in a plane or for all spokes is controlled synchronously by an electronic control unit. The increase in apparatus expenditure that is involved due to the larger number of individual drives is compensated by the fact that there is no need for a central drive system for actuating all spokes, and a transmission system. The communication of commands to the respective drive units can be implemented synchronously by means of electronic control commands, at a low level of complication and expenditure, as it is possible with simple technically known means to communicate the same control command to all drive units at the same time.

Preferably, in accordance with this embodiment, each spoke has a telescopic spindle drive, a magnetic linear drive or a toothed rack drive. All those drive systems can advantageously be operated by means of electronically actuable control motors.

In a further preferred embodiment of the invention the electronic control unit is adapted to actuate the central drive unit or the drive unit for each plane of spokes or each of the decentral drive units in such a way that each plane of spokes defines a predetermined circle diameter at the outer end of the spokes.

In a further preferred development of the apparatus the bars are pivotable out of their position of being parallel in relation to the carrier structure or their mutually conically converging position into another position which is angled relative to the original position, by mechanical decoupling of all spokes down to a respective spoke.

Further preferably the bars are fixed to the spokes by means of a respective coupling member, wherein the coupling members are adapted for pivotal movement of the bars in the direction of the axis X and simultaneously for reducing the periphery, along which the bars are arranged. In a further preferred embodiment for each plane of the spokes two or more and preferably all coupling members are drivable by motor means for performing the pivotal movement.

In a further preferred embodiment for each bar at least one of said coupling members is blockable by means of a locking body, wherein the locking body is movable selectively into a locking position or a release position, preferably by means of pivotal movement.

Particularly preferably the locking body is adapted to extend in the locking position arcuately around the coupling member and to close a gap between spokes and bar, wherein the shape of the locking body is adapted to correspond to that of the gap.

BRIEF DESCRIPTION OF THE SEVERAL VIEWS OF THE DRAWINGS

The invention is described in greater detail hereinafter by means of preferred embodiments by way of example and with reference to the accompanying Figures in which.

DETAILED DESCRIPTION

Figure 1:
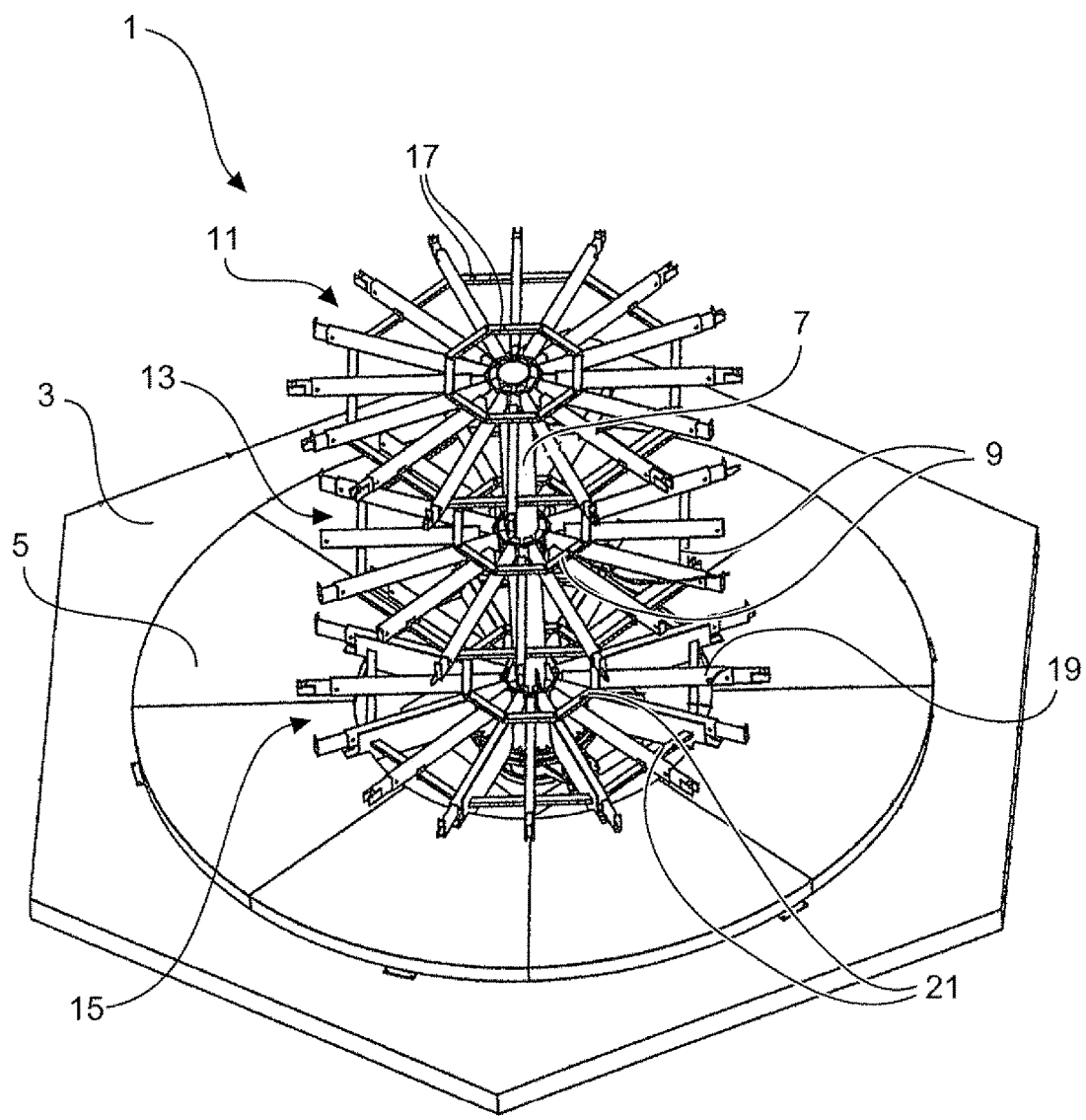
FIG. 1 shows a perspective view of the apparatus in a first embodiment of the invention.

FIG. 1 shows the basic structure of an apparatus for producing reinforcement cages for pylon segments. The apparatus 1 has a stationary base plate 3, relative to which there is arranged a rotationally drivable platform 5. Preferably the rotationally drivable platform 5 is supported on the stationary base plate 3. Extending perpendicularly from the platform 5 is a carrier structure 7. Arranged on the carrier structure 7 in a total of three planes 11, 13 and 15 are respective pluralities of spokes 19. The spokes 19 extend from the carrier structure outwardly. In the illustrated embodiment the spokes 19 of which only one is denoted by a reference numeral for the sake of clarity of the drawing are oriented in a star configuration. It will be noted however that other orientations are also possible as long as lengthwise adjustment of the spokes leads to an altered periphery of the notional boundaries extending around the spokes. The spokes in the uppermost plane 11 are connected together by means of transverse struts 17 for stiffening purposes. The spokes in the second plane 13 which is arranged at a spacing from the first plane 11 are connected together by means of transverse struts 9 for stiffening purposes and the spokes in the third plane 15 which is arranged spaced from the second plane 13 are connected together by means of transverse struts 21 for stiffening purposes.

FIG. 2 shows once again the arrangement of the different planes 11, 13 and 15 in mutually superposed relationship in the apparatus 1. In this respect the term plane is not used to denote the strictly geometrically horizontal orientation of the spokes, but the arrangement of similarly different platforms in building structures or on support frames. In the embodiment shown in FIGS. 1 and 2 however the struts are actually oriented substantially perpendicularly to the axis of rotation X of the carrier structure 7.

Figure 2:
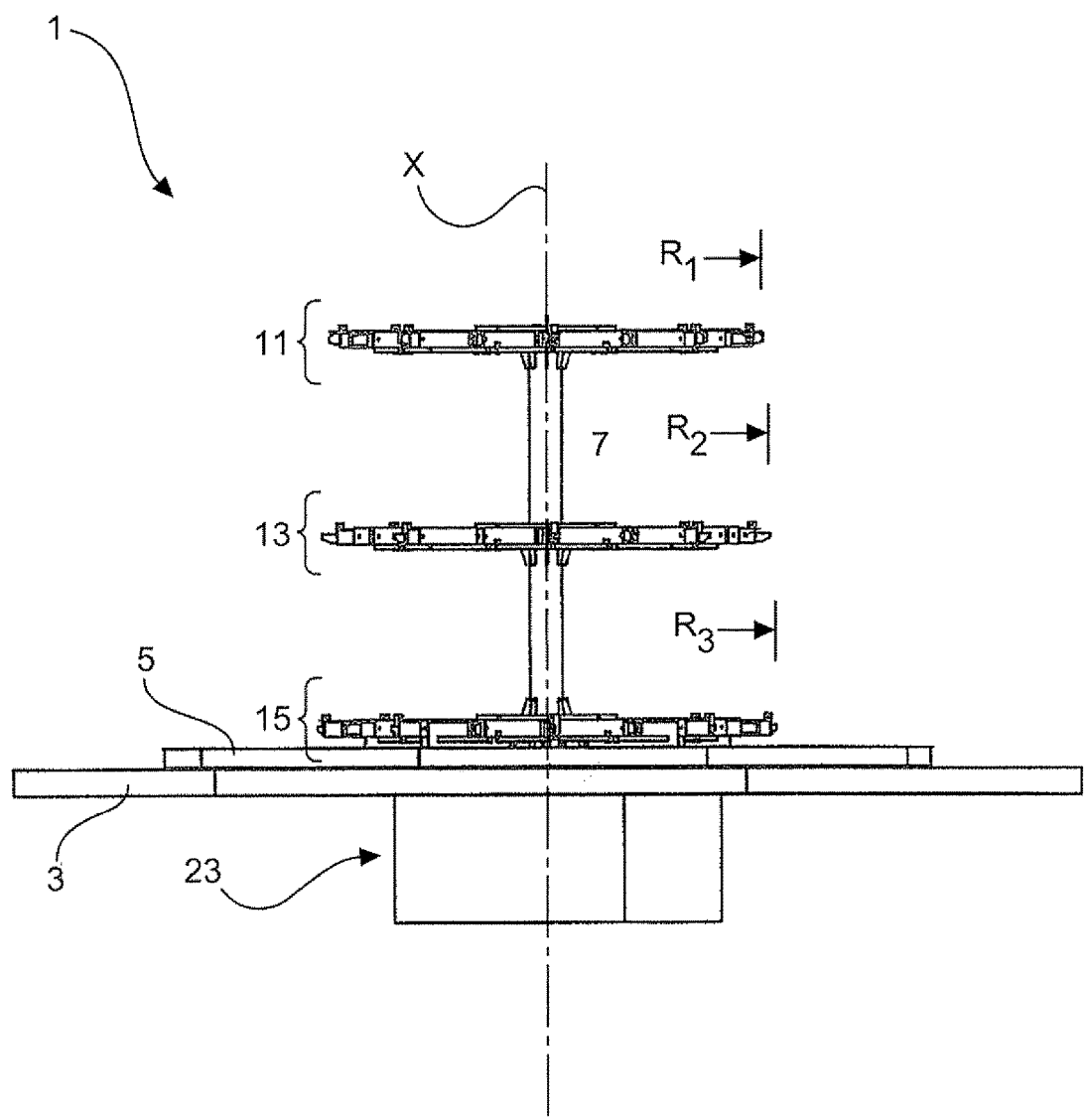
FIG. 2 shows a side view of the apparatus of FIG. 1.

The spokes in the first plane 11, by means of their radially outermost points, define a radius R1. The spokes of the second plane 13 similarly define a radius R2 and the spokes of the third plane 15 similarly define a radius R3. FIG. 2 further shows that a housing 23 is provided beneath the stationary platform 3. Arranged within the housing 23 are preferably the drive units for the carrier structure 7 as well as a central drive unit or an electronic control unit for controlling a plurality of decentral drive units (not shown).

Figure 3:
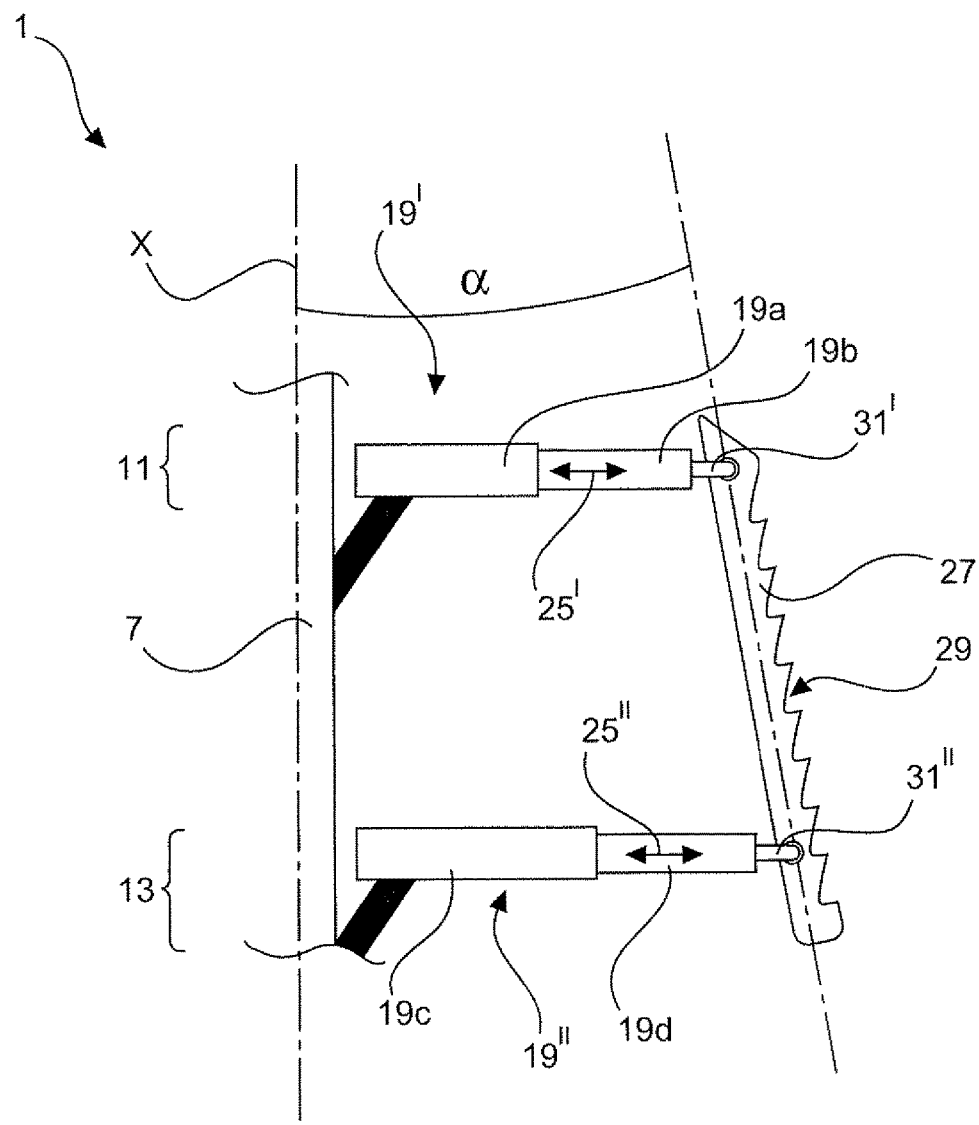
FIG. 3 shows a sketch in principle showing a detail from FIG. 2.

FIG. 3 shows a diagrammatic broken-away view from the apparatus of FIG. 2. The view is restricted to a spoke 19' arranged in the first plane 11 and a spoke 19" arranged in the second plane 13.

While the bars for receiving the reinforcement wires have also been removed in order to more clearly to illustrate the carrier structure and the spoke arrangement in FIGS. 1 and 2, FIG. 3 shows by way of example a bar 27 in the mounted position. In the illustrated position the bar 27 is oriented at an angle α relative to the vertical axis X. When this is applied to all bars on an apparatus according to one embodiment of the invention, this means that the bars converge conically towards each other. The angle α can be predetermined by the differing length of a main body 19a of the spoke 19' and a length, differing therefrom, of the main body 19c of the spoke 19". If the telescopic elements 19b, 19d of the spokes 19', 19" are fully retracted, the angle is defined from the spacing of the spokes 19' and 19" relative to each other in the direction of the axis X and the differing length of the bodies 19a, 19c. Alternatively the angle is adjustable by the telescopic member 19b of the spoke 19' being displaced in the direction of the arrow 25' by a different amount from the telescopic member 19d of the spoke 19" in the direction of the arrow 25".

As can also be seen from FIG. 3 the bar 27 has a plurality of receiving means 29, such as slots shown, for guiding reinforcement wires. The bar 27 is pivotably connected by means of a coupling member 31', 31" in the respective plane 11, 13 to the corresponding telescopic member 19b, 19d of the spokes 19', 19". If the apparatus is designed to perform the lengthwise adjustments of the spokes 19', 19" in the direction of the arrows 25', 25" differently from each other, slot guides for receiving the coupling members 31', 31" are preferably provided in the bar 27 in order to take account of the resulting change in the angle α.

Figure 4:
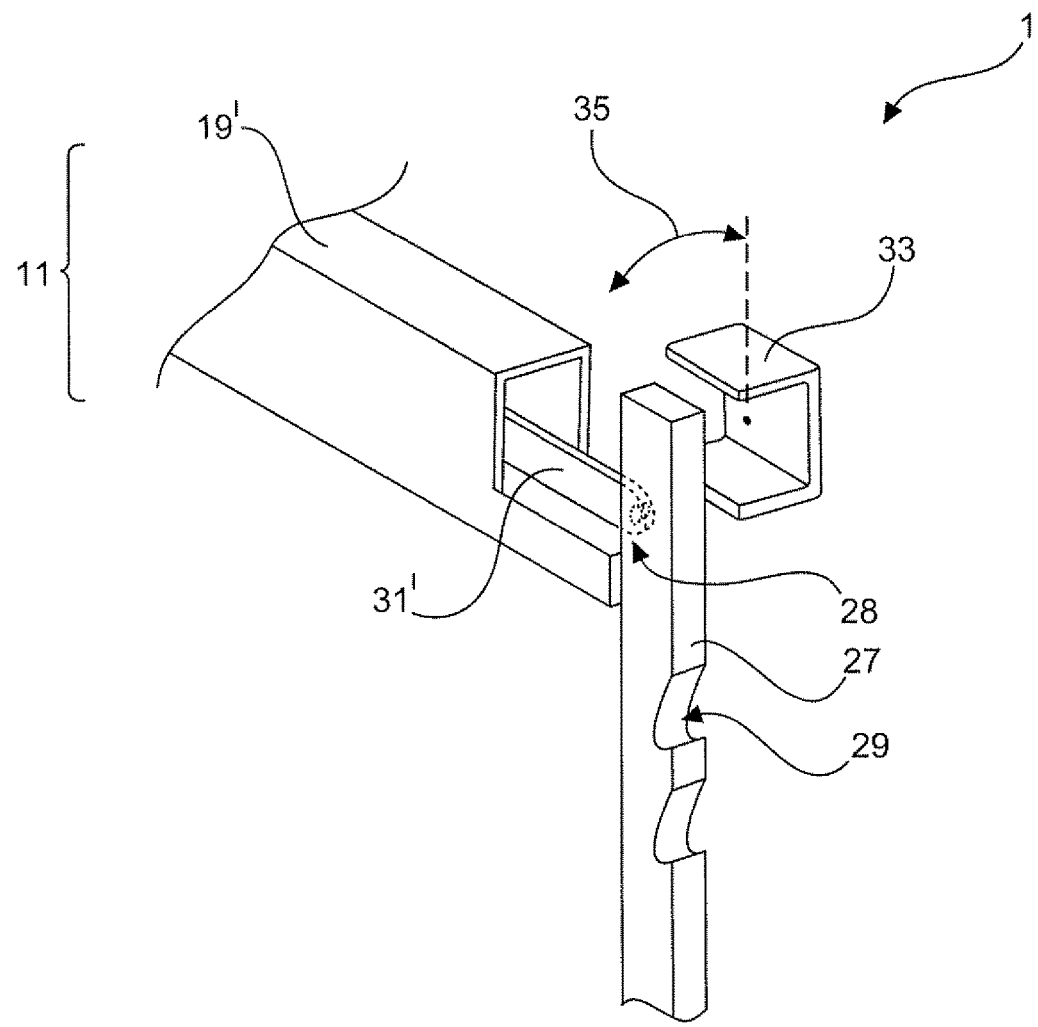
FIG. 4 shows a perspective view of a detail of the apparatus in a further embodiment.

FIG. 4 shows a further aspect with the apparatus 1 according to one embodiment of the invention, looking at the example of a spoke 19' considered by way of example in the plane 11. At a radially outer end of the spoke 19' the coupling member 31' extends outside the spoke 19'. The coupling member 31 is pivotably coupled in a portion 28 to the bar 27. A gap is formed between the spoke 19' and the bar 27. The width of the gap substantially corresponds to the width (in the radial direction) of a locking body 33. The locking body 33 is shown in a release position in FIG. 4. To prevent a pivotal movement of the coupling member 31' and thus to fix the spacing of the bar relative to the carrier structure (not shown), the locking body 33 can be moved out of the illustrated release position into a locking position. In the preferred embodiment that is done by means of a pivotal movement in the direction of the arrow 35. The locking body is moved into contact with the spoke 19' and the bar 27, by means of the pivotal movement. A locking means is optionally provided. The pivotal movement is optionally implemented by means of a control motor or a mechanical deflection means such as for example a cable line arrangement. In the locking position the radial spacing of the receiving means 29 in relation to the axis of rotation X of the carrier structure 7 (see FIG. 2) is fixed and is kept constant during operation of the apparatus 1, thereby ensuring uniform production of the reinforcement cage.

Figure 5:
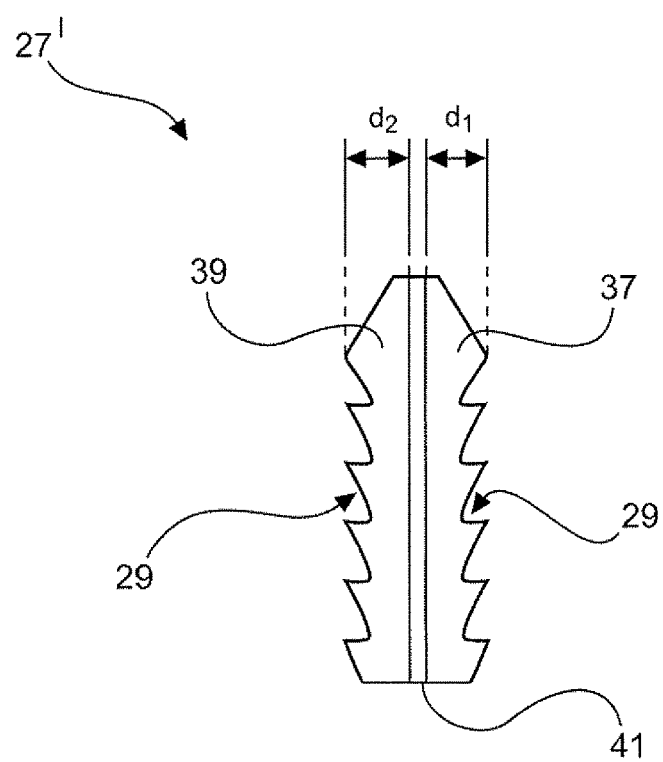
FIGS. 5 and 6 show side and cross-sectional views of a part of the apparatus in a further embodiment of the invention.
Figure 6:
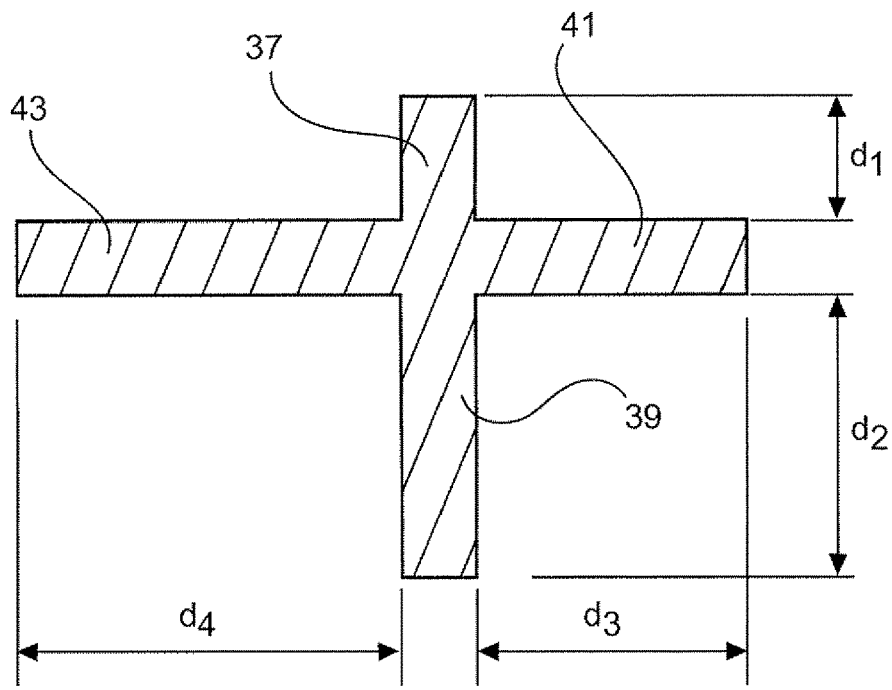

FIGS. 5 and 6 show a variant 27' of the bar which has the recesses 29. As a basis, the bar 27' has an elongate four-cornered body, from the four elongate sides of which extends a respective flank having a plurality of recesses 29. In this case a first flank 37 has the flank height d1. Unlike that flank height d1, the second flank 39 has a flank height d2 different from the flank height d1. A third flank 41 has the flank height d3 while a fourth flank 43 has the flank height d4. The flank heights d1, d2, d3, d4 are respectively different from each other. The bar 27' can be coupled to the spokes of the apparatus in such a way that one of the four flanks 37, 39, 41, 43 faces away from the axis of rotation X of the carrier structure 7 so that only that flank is brought into engagement with the reinforcement wires. Due to the different flank heights, different outside diameters or circle peripheries for the reinforcement wires to be received can also be predetermined by means of the bars 27' which can be positioned in the four different angular positions. The bar 27' thus permits rapid adjustment of the reinforcement cage diameter in a narrow range, without control interventions on the part of the drive unit for motorized lengthwise adjustment of the spokes having to be explicitly implemented for that purpose.

Figure 7:
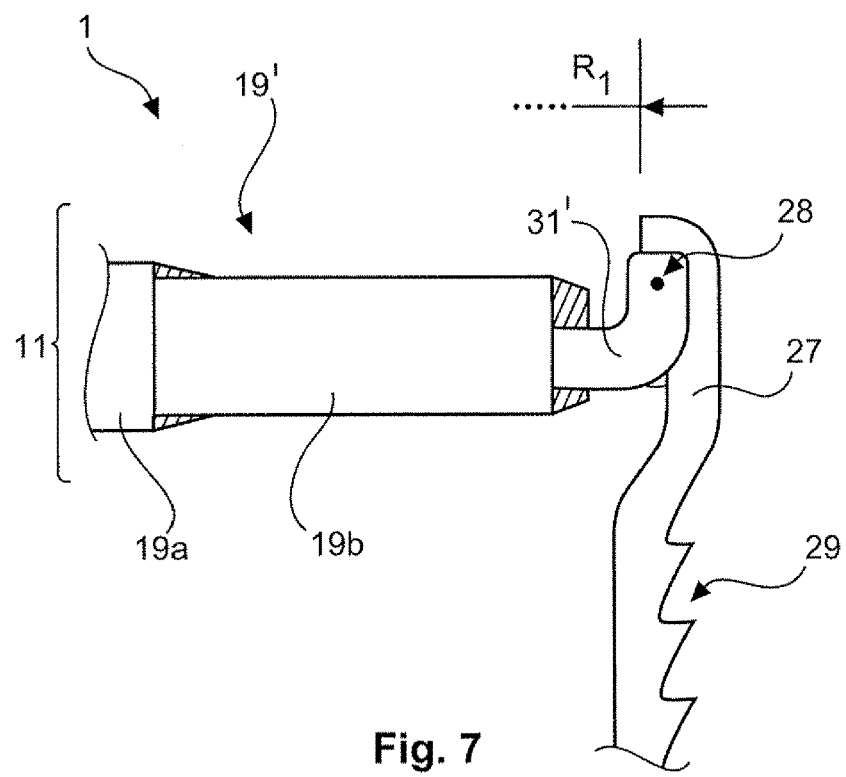
FIGS. 7 and 8 show a detail view of the apparatus according to the invention in a further embodiment in different operating conditions.
Figure 8:
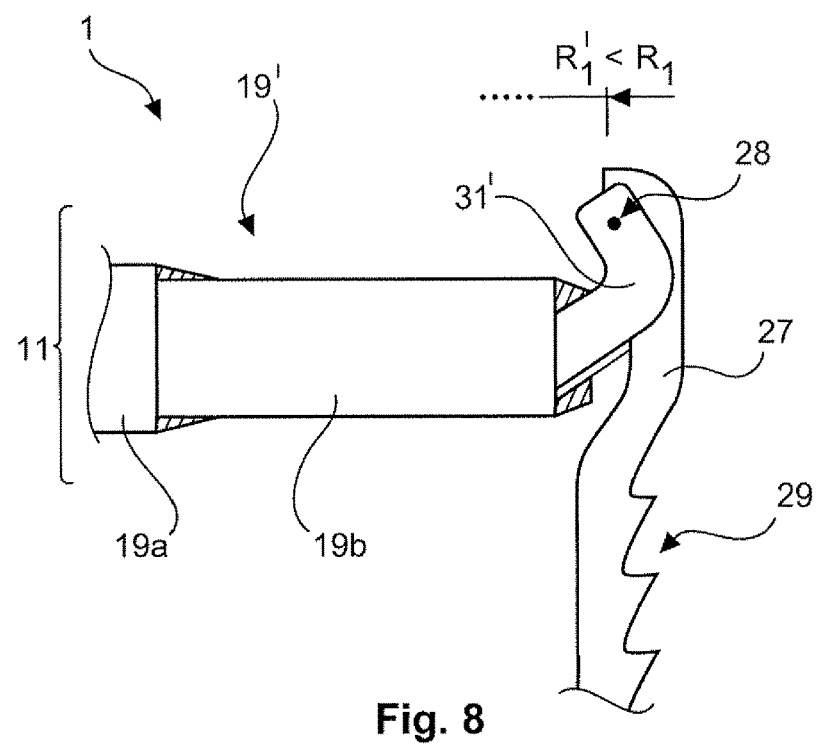

FIG. 7 shows a further detail of a preferred embodiment of the invention, in relation to a spoke 19' by way of example. The telescopic member 19b can be extended from the main body 19a of the spoke 19' by a given length. The coupling member 31' extends out of the telescopic member 19b and is coupled to the bar 27 at the point 28. In that case the receiving means 28 defines a radial spacing R1 from the axis X (not shown). In the condition shown in FIG. 7 the apparatus 1 is disposed in a position in which the reinforcement wires can be received or are received or have already been received. That condition in which stabilization of the reinforcement wires must be guaranteed is constant at R1. After production of the reinforcement cage, that is to say after the circular reinforcement wires are tied to the additional stiffening elements, the apparatus 1 is converted into a condition as shown in FIG. 8. In the FIG. 8 condition the coupling member 31' is pivoted upwardly. The same movements are also performed by the other coupling members (not shown) in the other planes of the apparatus. As a result the bar 27 is moved both upwardly (with respect to the orientation in FIG. 8 in the direction of the axis X, FIG. 2) and at the same time displaced inwardly in a direction towards the axis X. The radial spacing that the receiving means 28 now assumes relative to the axis X is R1' which is less than R1. By virtue of the pivotal movement of the coupling members the reinforcement wires are released from the receiving means 29 and the reinforcement cage produced can be removed upwardly from the apparatus 1. The design configuration of the spokes with pivotable coupling members is particularly advantageous for the reason that it is possible for the reinforcement cages to be rapidly released from the apparatus 1 without having to alter the length of the spokes which are adjusted by motor means, by control commands, for that purpose. The coupling members can be pivoted out of the position shown in FIG. 7 into the position shown in FIG. 8 by means of separate, purely mechanical actuation, while the length of the spokes remains unchanged.

Figure 9:
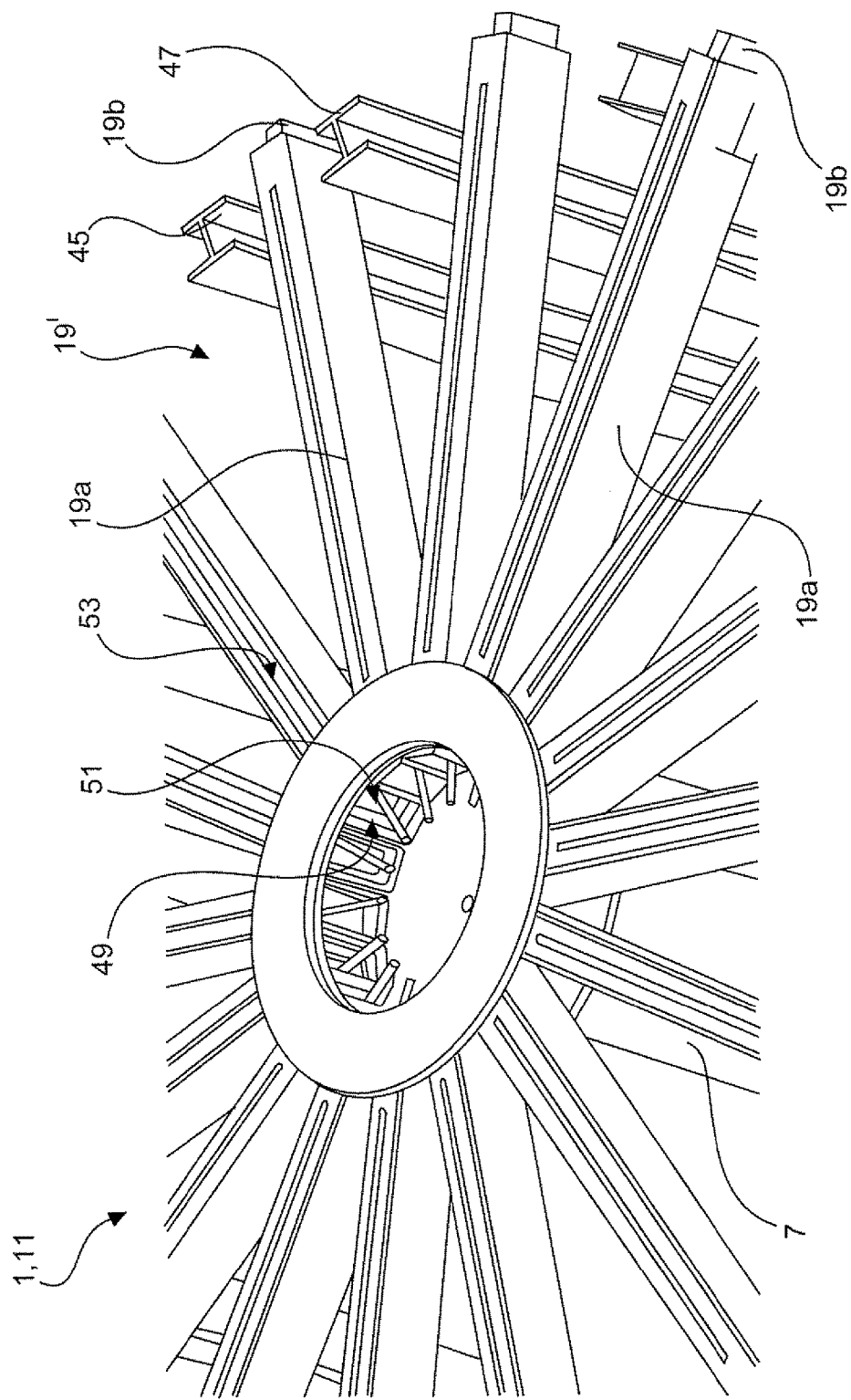
FIG. 9 shows a perspective detail view of the apparatus according to the invention in a further embodiment.

Finally FIG. 9 shows a further embodiment of the invention involving one of the various drive concepts according to the invention. FIG. 9 shows a view inclinedly from above on to the upper plane 11 of the apparatus 1. The telescopic members 19*b* of the spokes 19' are displaceable with a translatory movement within the main bodies 19*a*. A decentral drive unit 49 is arranged in each spoke for performing the translatory movement. In the example shown in FIG. 9 the decentral drive unit 49 is in the form of a telescopic spindle drive 51, by means of the actuation of which a carriage 53 performs a translatory movement guided by a longitudinal groove. The telescopic member 19*b* is coupled to the carriage 53 and as a consequence of actuation of the telescopic drive 51, is moved out or in by motor means. Support struts 45, 47 are arranged at left and right on a plurality of the spokes for laterally supporting and carrying mounting forces.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for producing reinforcement cages for pylon segments of wind power installations, the apparatus comprising:
    a carrier structure that is rotatable about an axis;
    a plurality of bars oriented in parallel or mutually conically converging relationship relative to the axis and distributed along a periphery of the apparatus, each of the plurality of bars having a plurality of recesses adapted to receive reinforcement material; and
    two or more spokes coupling each of the plurality of bars to the carrier structure, the spokes being arranged in planes that are perpendicular to the axis, the spokes having longitudinal lengths, wherein the spokes are adjustable telescopically along the longitudinal lengths of the spokes by motor means.

2. The apparatus according to claim 1 wherein the longitudinal lengths of the spokes are synchronously adjustable in a plane.

3. The apparatus according to claim 1 wherein the longitudinal lengths of the spokes are continuously adjustable within a range.

4. The apparatus according to claim 1, comprising a drive for providing the motor means for telescopically adjusting the longitudinal lengths of the spokes, wherein each spoke is synchronously drivable by the drive.

5. The apparatus according to claim 4, the drive comprising a plurality of drive units, each coupled to a respective spoke, the drive units being configured to telescopically adjust the longitudinal length of the corresponding spoke.

6. The apparatus according to claim 5 further comprising an electronic control unit, wherein the respective drive units for all spokes in a plane are synchronously controlled by the electronic control unit.

7. The apparatus according to claim 5 wherein each spoke has a telescopic spindle drive, a magnetic linear drive, or a toothed rack drive.

8. The apparatus according to claim 6 wherein the electronic control unit is adapted to actuate the drive units for each plane of spokes or each of the decentral drive units in such a way that each plane of spokes defines a predetermined circle diameter at an outer end of the spokes.

9. The apparatus according to claim 1 wherein the plurality of bars are foldable out of a position of being parallel with respect to the carrier structure into an angled position.

10. The apparatus according to claim 1 wherein the plurality of bars are fixed to the spokes by a respective coupling member, wherein the coupling members are adapted for pivotal movement of the plurality of bars in the direction of the axis and simultaneously for reducing a periphery of the apparatus at which the plurality of bars are arranged.

11. The apparatus according to claim 10 wherein for each plane of the spokes, two or more coupling members are drivable by a motor means for performing the pivotal movement.

12. The apparatus according to claim 10 wherein for each bar at least one coupling member is blockable by a locking body, wherein the locking body is selectively movable between a locking position and a release position.

13. The apparatus according to claim 12 wherein the locking body is adapted to extend in the locking position arcuately around the coupling member and to close a gap between a respective spoke and bar.

14. The apparatus according to claim 1 wherein the plurality of bars are distributed uniformly around the carrier structure.

15. The apparatus according to claim 12 wherein the locking body is selectively movable between the locking position or the release position by a pivotal movement.

\* \* \* \* \*